June 9, 1931.  E. S. HEBELER  1,808,983
CARRIER FOR SPARE WHEELS AND TIRES
Filed Dec. 29, 1928  2 Sheets-Sheet 1
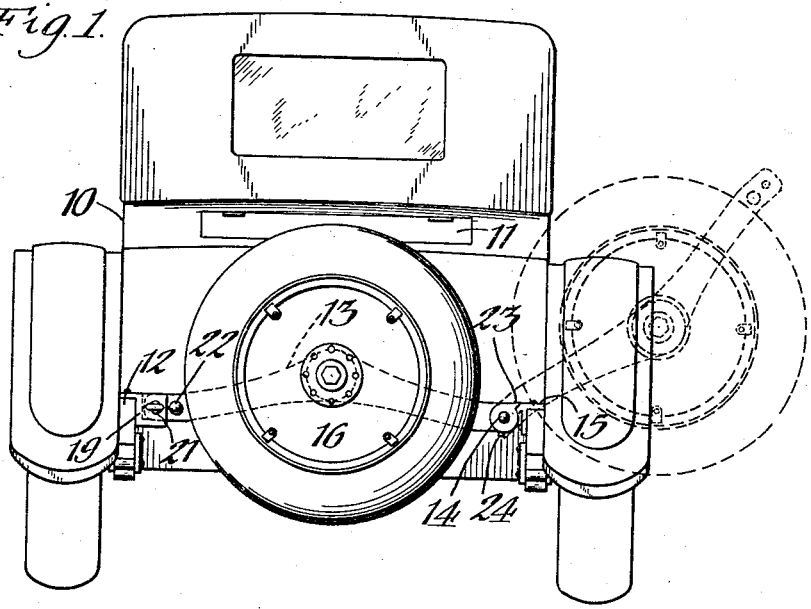
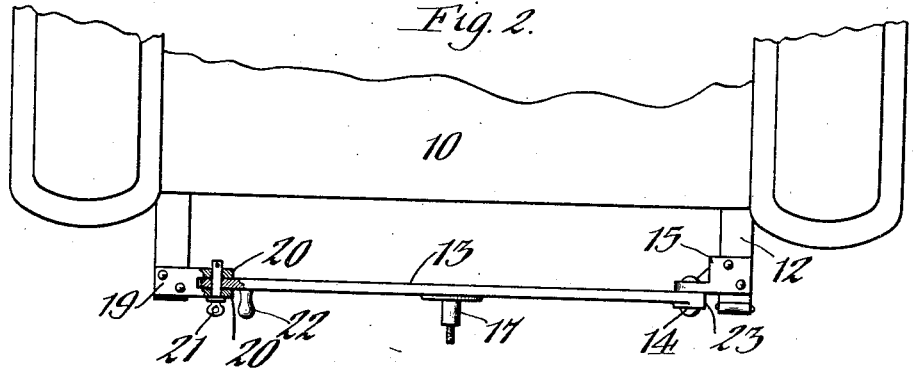
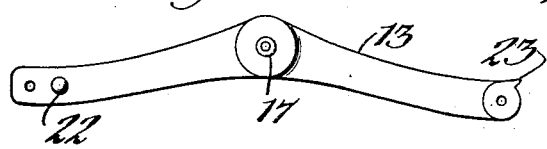
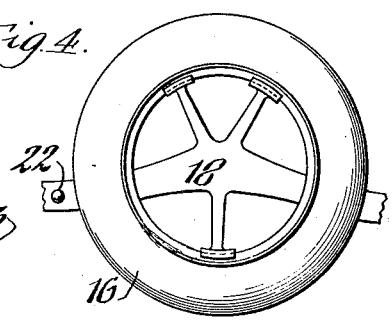
Inventor,
Edward S. Hebeler,
by Walter P. Geyer
Attorney.

June 9, 1931.  E. S. HEBELER  1,808,983
CARRIER FOR SPARE WHEELS AND TIRES
Filed Dec. 29, 1928  2 Sheets-Sheet 2
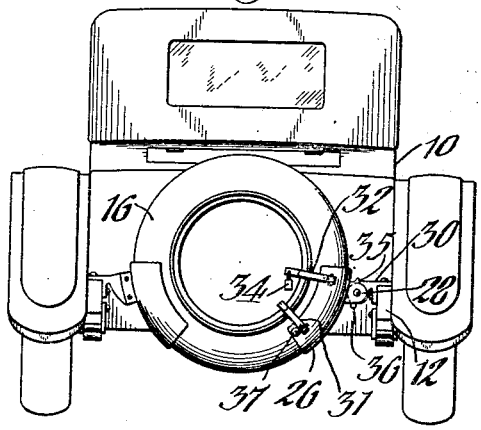
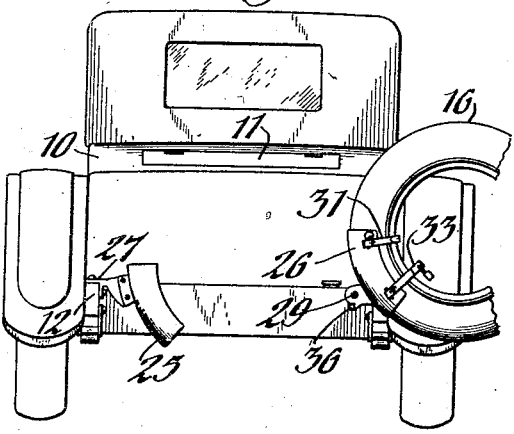
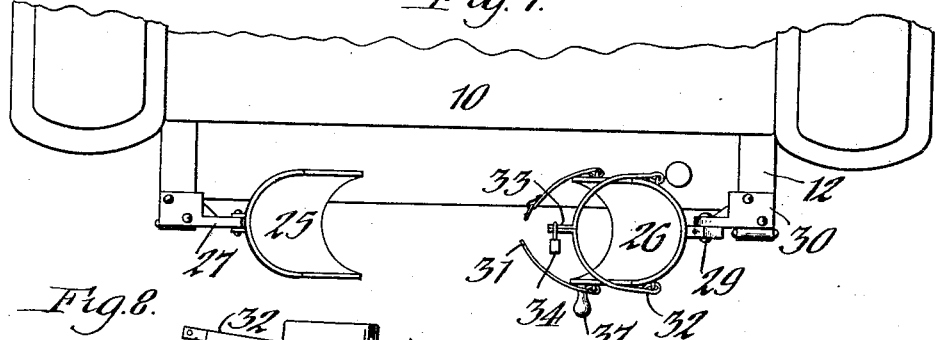
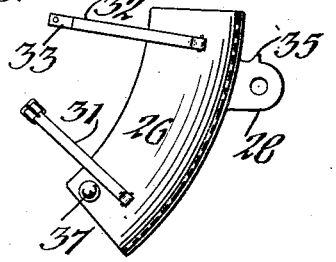
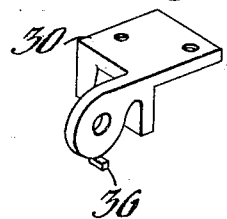
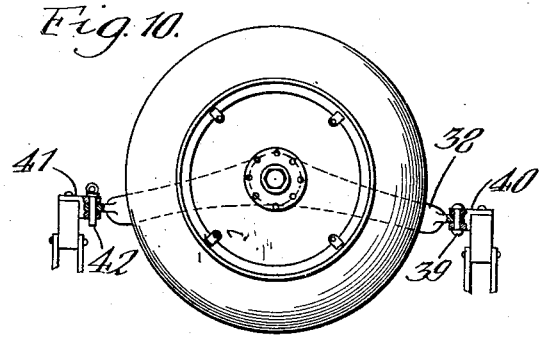
Inventor,
Edward S. Hebeler,
by Walter P. Geyer
Attorney.

Patented June 9, 1931

1,808,983

UNITED STATES PATENT OFFICE

EDWARD S. HEBELER, OF BUFFALO, NEW YORK

CARRIER FOR SPARE WHEELS AND TIRES

Application filed December 29, 1928. Serial No. 329,115.

This invention relates to improvements in spare wheel or tire carriers of the type positioned at the rear end of an automobile.

One of its objects is the provision of a carrier of this character which has been designed for conveniently effecting the movement of the spare wheel or tire away from the rear end of the automobile, when it is desired to gain access to the rear end thereof, as for example, in the case of a coupé having a compartment at its rear end.

Another object of the invention is to provide a carrier which is simple, compact and inexpensive in construction, and whose parts are organized and arranged to reliably support the spare wheel or tire against displacement and yet enable it to be readily shifted to one side of its normal central position with a minimum of effort and without the use of tools or other appliances.

In the accompanying drawings:—

Figure 1 is a rear end view of an automobile showing a spare wheel carrier of my preferred construction. Figure 2 is a fragmentary top plan view of the rear end of an automobile showing the tire carrier in place therein. Figure 3 is a detached side view of the carrier-arm. Figure 4 is a fragmentary side view of a carrier-arm equipped with a spider support for a spare tire. Figure 5 is a rear end view of an automobile showing a modified form of my invention. Figure 6 is a similar view showing the carrier positioned at one side of the rear end of the car. Figure 7 is an enlarged top plan view of the same. Figure 8 is a detached side view of the pivoted supporting member of the carrier shown in Figures 5, 6 and 7. Figure 9 is a perspective view of the bracket to which the pivoted carrier member is connected. Figure 10 is a face view, partly in section of another modification of my invention.

Similar characters of reference indicate corresponding parts throughout the several views.

By way of example, my invention has been shown applied to an automobile 10, of the coupé type, having a compartment at its rear end normally closed by a door 11. Attached to the rear end of the frame-bars 12 or other fixed part of the car are the elements which constitute my improved carrier.

In the preferred embodiment of my invention shown in Figures 1 to 4 inclusive, the carrier consists of a movable member in the form of a vertically-swinging arm 13 fulcrumed at one end, as indicated at 14, to a suitable bracket 15 fixed on one of the frame-bars 12. Disposed on this arm intermediate its ends is a support or holder for the spare tire or spare wheel, the support shown in the drawings being particularly intended for receiving a spare wheel 16 and consisting of an arbor or stud 17 over which the hub of the wheel is slipped and to which it is suitably fastened to prevent its accidental displacement. In the case of supporting a spare tire, which is usually mounted on its rim, the holder may consist of a ring or spider 18 applied to the carrier-arm for receiving said rim, as shown in Figure 4. The free end of the arm 13 may rest on a base plate 19 between a pair of upright flanges 20 formed thereon, the base plate being suitably fastened to the companion frame-bar 12. These flanges hold the arm against displacement lengthwise of the automobile and a cotter pin 21 or like element may be employed for holding the arm against accidental upward displacement. A knob or handle 22 provided adjacent to the free end of the carrier-arm to facilitate shifting the same into and out of its normal position.

For the purpose of limiting the movement of the carrier-arm to the position shown by dotted lines Figure 1, its pivoted end is preferably provided with a tooth or projection 23 adapted to engage a stop lug 24 formed on the bracket 15, these elements functioning also to sustain the arm in its laterally swung position to one side of the rear end of the vehicle.

When it is desired to gain access to the compartment at the rear end of the vehicle, the operator removes the cotter pin 21 and grasps the knob 22, swinging the carrier from the position shown by full lines in Figure 1 to that shown by dotted lines in the same figure, the stop members 23, 24 serving to sustain the carrier in such position, wherein the spare wheel or tire is disposed at one side of the car and the operator is free to conveniently reach the vehicle compartment with comparative ease and without liability of soiling his clothing.

In the modification of the invention shown in Figures 5 to 9 inclusive, the carrier comprises a pair of supporting members 25, 26, of segmental or arcuate shape in plan to receive a tire in an approximately upright position between them and of trough-shape in cross section so as to fit snugly about the periphery and adjoining sides of the tire. One of the supporting members is fixed on the corresponding frame-bar 12 of the car and merely functions as a rest for one side of the tire in its normal position, while the other member is mounted for movement relative to its frame bar and has the tire fastened to it to enable the tire to be shifted out of its normal position centrally of the car to a position at one side thereof, whereby the rear end of the car is exposed and unobstructed, permitting access to be conveniently had to the rear compartment of the vehicle. To this end, the supporting member 25 is fixed to a bracket 27 attached to one of the frame-bars 12 and the supporting member 26 has an ear or projection 28 pivotally connected at 29 to a bracket 30 secured to the other frame-bar of the vehicle. Both supporting members terminate at their upper edges at or below a horizontal line drawn diametrically across the tire, whereby these members conjointly form an upwardly opening groove or recess into and out of which the tire is inserted and removed in a substantially vertical plane, the tire resting by gravity on its carrier members.

The movable carrier member 26 is provided with a flexible strap 31 and a metallic strap 32 for detachably holding the tire in place thereon, the metallic strap being composed of hinged sections terminating at their free ends in coupling flanges 33 for receiving a padlock 34, whereby the tire may be locked to the carrier. The laterally-swinging movement of the carrier member 26 is limited by cooperating stop elements 35, 36, formed on the carrier member and its bracket 30, respectively. A knob or handle 37 on the carrier member 26 facilitates the movement of the device into and out of its normally central position.

In the modified form of the invention shown in Figure 10, the carrier arm 38 is fulcrumed to swing horizontally on a vertical fulcrum pin 39 secured to a bracket 40. The other end of the arm is coupled to a similar bracket 41 by a detachable pin 42. With this construction, the carrier is swung from the rear end of the car in a horizontal plane when access to the car-compartment is desired.

I claim as my invention:—

1. A carrier for the spare wheel or tire of a vehicle, comprising a vertically-swinging supporting member fulcrumed at one side of the longitudinal axis of the vehicle for movement in a plane crosswise thereof and including means for holding a spare wheel or tire thereon, means applied to the vehicle at one side of the fulcrum of said supporting member for sustaining the latter in position centrally at the rear end of the vehicle, and means on the vehicle for sustaining said member in a reversed position at the opposite side of said fulcrum transversely at one side of the vehicle above the ground and clear of its rear end to render the same accessible.

2. In a device of the character described, a pair of brackets adapted for attachment to the rear ends of the side frame members of a vehicle, a vertically-swinging carrier fulcrumed on one of the brackets to swing in a plane crosswise of the vehicle to assume a normal position centrally at its rear end and an abnormal inverted position clear of the rear end of the vehicle and at one side thereof, said carrier being engageable with the other of said brackets in its normal position, and complementary stop elements applied to the carrier and said first-named bracket for sustaining the carrier in its abnormal position.

EDWARD S. HEBELER.